United States Patent [19]

Hasler et al.

[11] 4,240,227
[45] Dec. 23, 1980

[54] WINDOW ASSEMBLY FOR VEHICLES

[75] Inventors: Franz Hasler; Peter Wätzold, both of Wettstetten; Steffen Freudenberg, Ingolstadt, all of Fed. Rep. of Germany

[73] Assignee: Audi NSU Auto Union AG, Neckarsulm, Fed. Rep. of Germany

[21] Appl. No.: 17,833

[22] Filed: Mar. 6, 1979

[30] Foreign Application Priority Data

Mar. 7, 1978 [DE] Fed. Rep. of Germany ....... 2809721

[51] Int. Cl.³ ............................................. E05F 11/38
[52] U.S. Cl. ....................................... 49/348; 49/374; 49/440
[58] Field of Search ................. 49/348, 372, 374, 378, 49/413, 428, 431, 433, 436–438, 440, 360, 502

[56] References Cited

U.S. PATENT DOCUMENTS

| 2,024,773 | 12/1935 | Lohrman | 49/374 |
| 2,941,838 | 6/1960 | Wernig | 49/374 X |
| 3,703,053 | 11/1972 | De Rees et al. | 49/440 X |

FOREIGN PATENT DOCUMENTS 2551450 5/1977 Fed. Rep. of Germany ............ 49/374

*Primary Examiner*—Kenneth Downey
*Attorney, Agent, or Firm*—Karl F. Ross

[57] ABSTRACT

A window assembly, especially for the side door or doors of an automotive vehicle, comprises a window frame having a pair of generally parallel rails formed as channels opening toward a window pane which can be raised and lowered on the vehicle. The window pane is provided with guide shoes or like members received in and guided on the respective channels and affixed to the pane inwardly of respective edges thereof so that these edges can be engaged, even along the face of the pane provided with the shoes or guide members, by seals on the frame or vehicle body.

8 Claims, 9 Drawing Figures

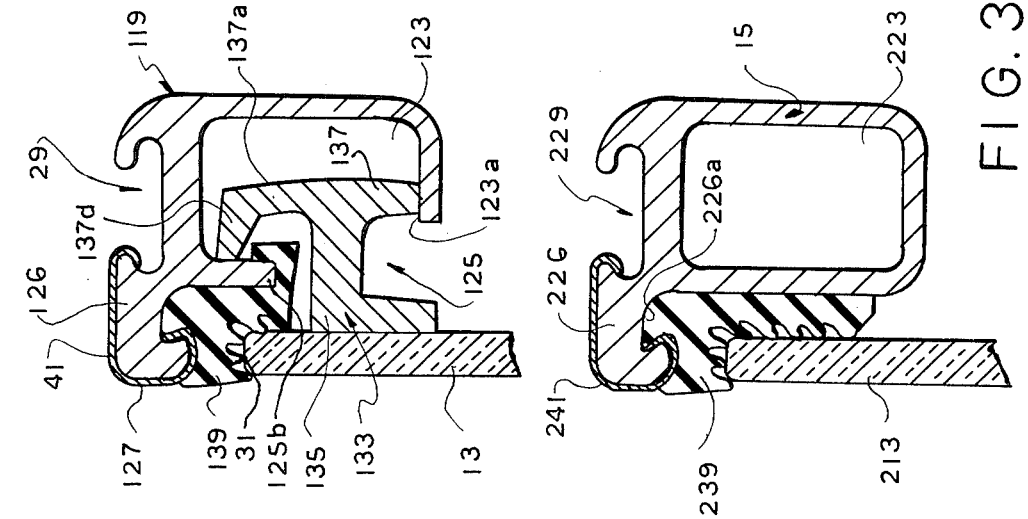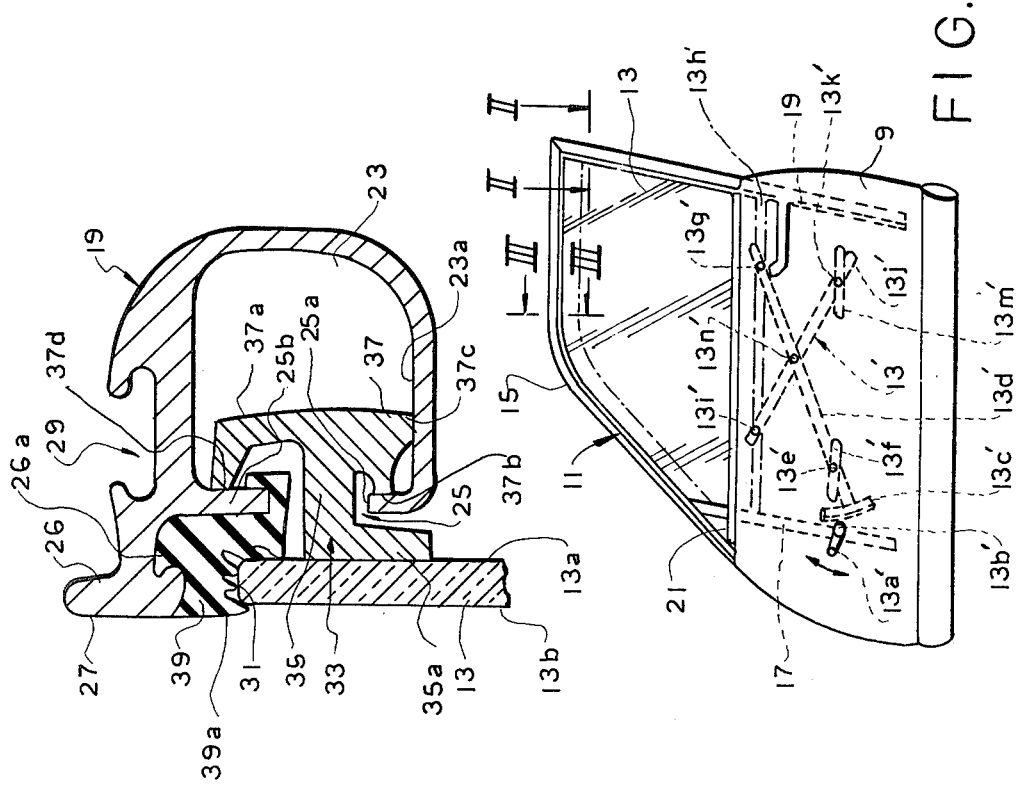

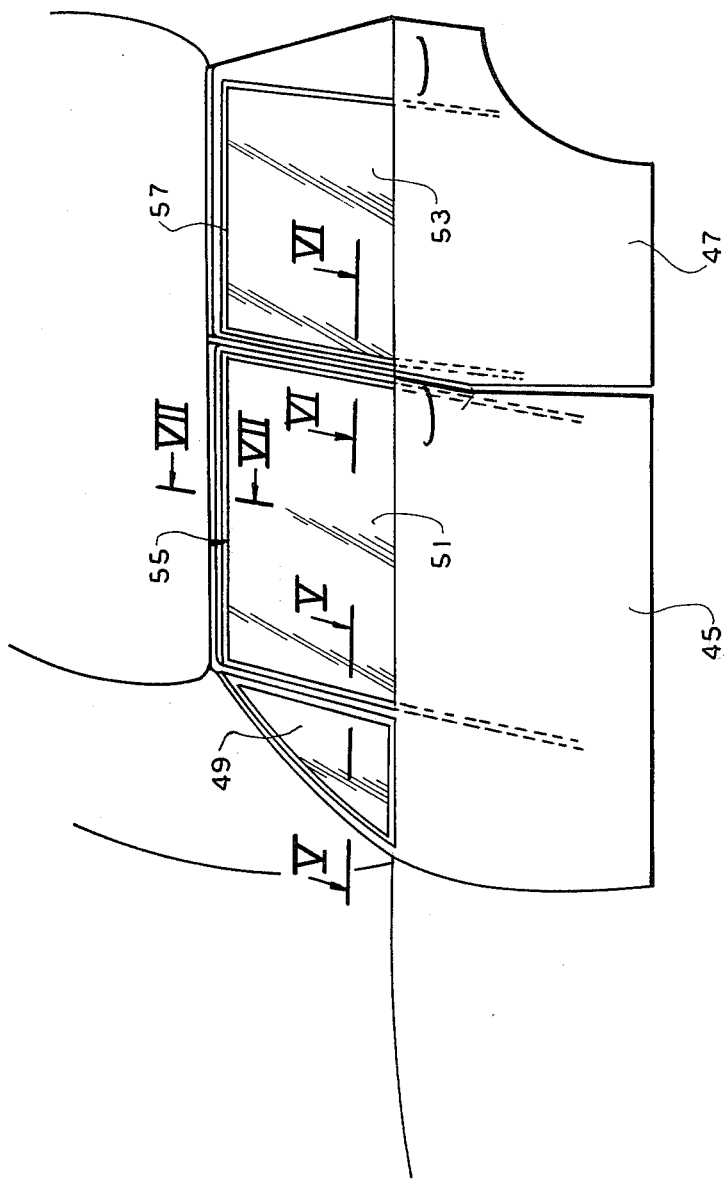

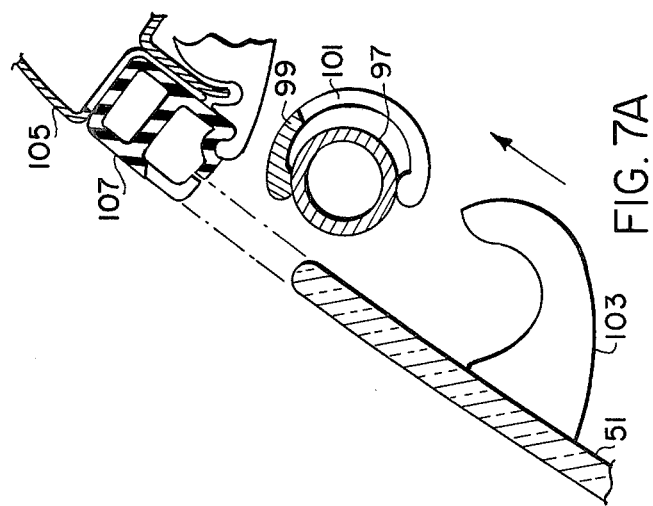
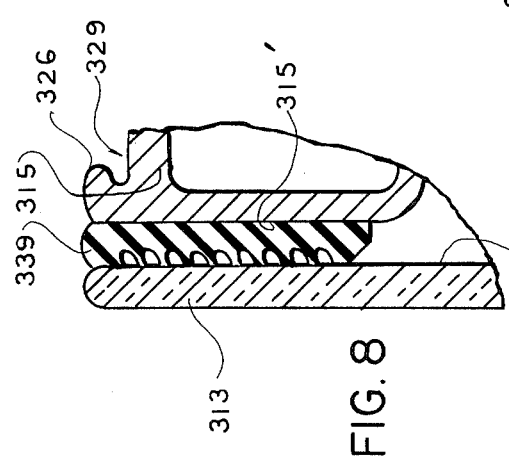
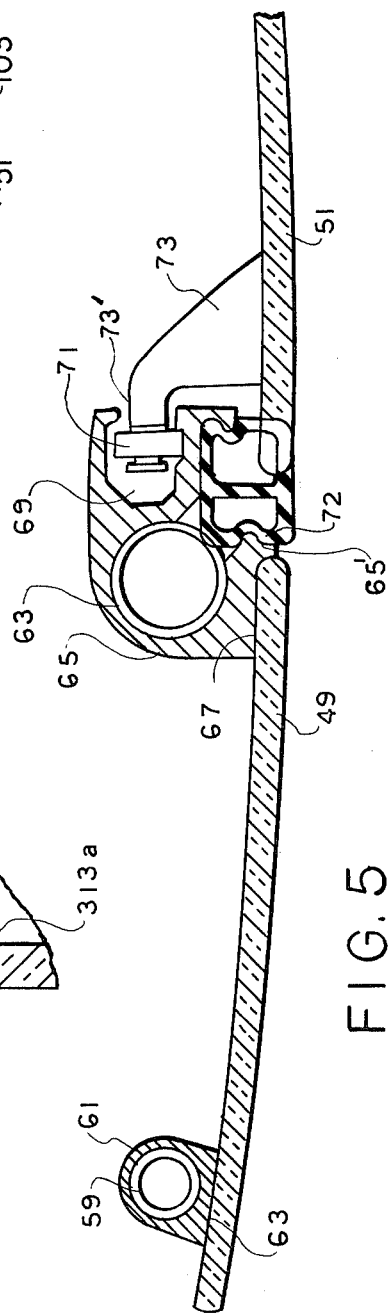

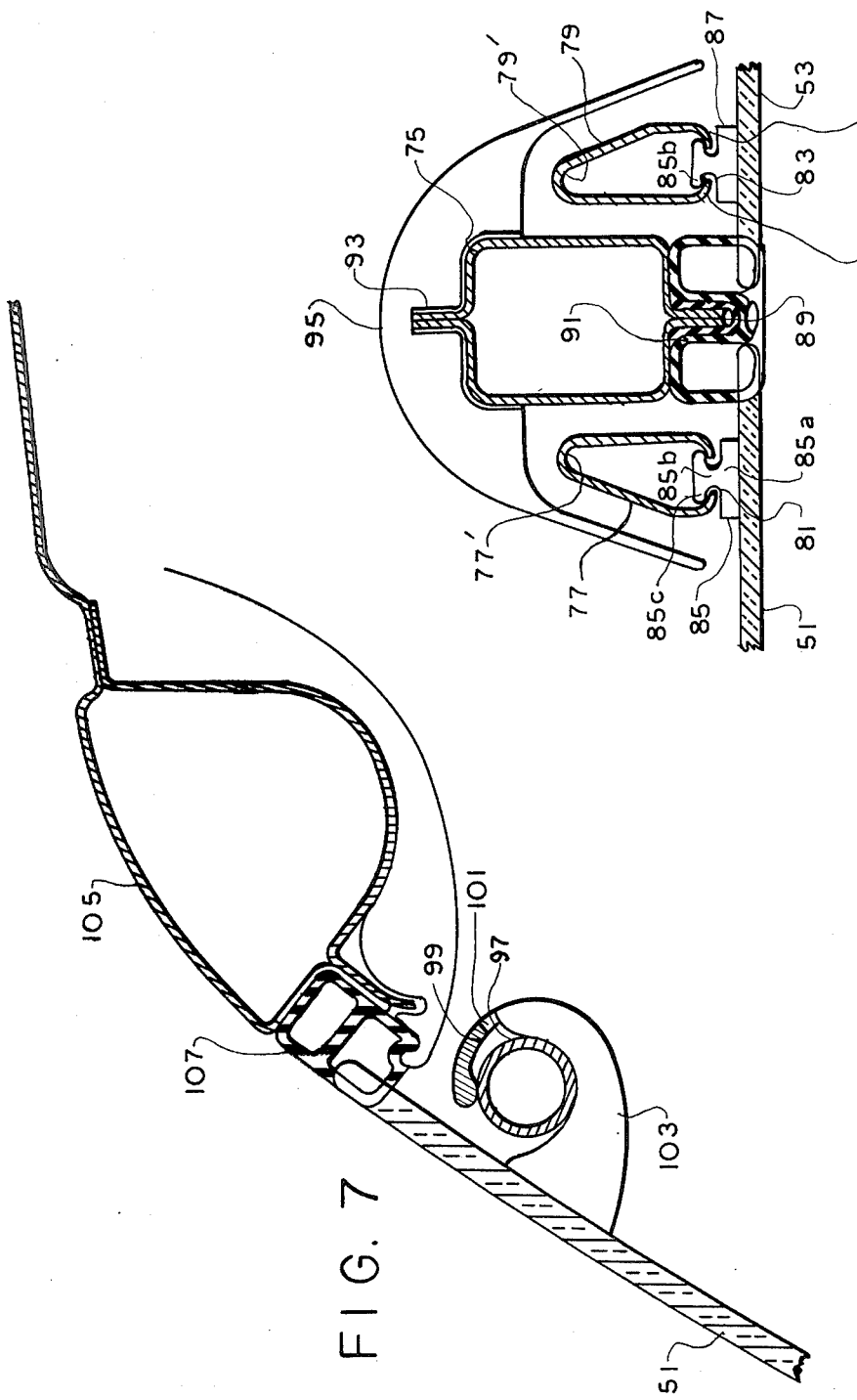

WINDOW ASSEMBLY FOR VEHICLES

FIELD OF THE INVENTION

The present invention relates to a window assembly for vehicles and, more particularly, to a window assembly for the side of a vehicle body, generally a door and which includes a window pane which is capable of being raised and lowered in a frame.

BACKGROUND OF THE INVENTION

A side-door window for automotive vehicles and, especially, passenger cars, generally comprises a pane which is movably received in guide rails which accommodate the edges of the window and can be provided with seals engaging the pane at least in the closed condition of the window.

Such systems may be designed so that in the region of the windows, the vehicle has a generally smooth configuration with a minimum of discontinuities.

Notwithstanding such designs, difficulties have been encountered with the air resistance of such vehicles, especially upon travel at elevated speeds. With increasing concern for energy efficiency, attempts have been made to minimize the air resistance by providing the outer surfaces of a passenger car with a smooth transition between the various members. These efforts have led to window designs such that gaps and discontinuities between the window and the frame, between the frame and other portions of the vehicle body or between the pane and the body are minimized.

The individual movable panes of the vehicle are generally received in or used in conjunction with frame structures which at least in part overlie the faces of the pane and can enclose the peripheral edges thereof. Since such systems unavoidably project outwardly (laterally) of the outer face of the window pane, they bring about undesired air resistance, create turbulence which produces noise, or generate unwanted whistling sounds. In sport coupe it is known to provide doors without frames which project from the body of the door so that the window is guided only in the door body and, in the closed position of the door, may cooperate with roof and post structures to bring a relatively smooth exterior surface.

However, when such vehicles travel at high speeds, a slight pressure gradient from the interior to the exterior can develop which can bend the window outwardly and break whatever seal may have been provided between the window and the vehicle body.

In the German patent publication (Offenlegungsschrift) DE-OS No. 24 35 766, there is described a guide arrangement for the window of a side door of a vehicle of the type described previously.

In one embodiment, the periphery of the pane is enclosed while a member extends inclinedly inwardly. A lower shank of the enclosure and a rear shank thereof carry guide rolls which cooperate with guide rails mounted in the door. Each guide rail is bent outwardly at its upper end so that, in the uppermost or closed position, the pane is pressed outwardly and is held against a seal carried by the window frame mounted on the door. While this provides a generally upright outer surface for the vehicle of the body, the assembly is expensive to manufacture and is not always reliable so that it has not found widespread acceptance.

OBJECTS OF THE INVENTION

It is the principal object of the present invention to provide an improved window assembly especially for the side door of an automotive vehicle such as a passenger car, whereby the disadvantages of earlier systems are avoided, the construction is simplified and reliable opening and closing movements of the window can be ensured.

Another object of this invention is to provide a window assembly for the purposes described which will provide a particularly smooth, gap-free joint with adjacent portions of the vehicle body and door.

SUMMARY OF THE INVENTION

These objects and others which will become apparent hereinafter, are attained in accordance with the present invention by providing a window assembly, especially for a side door of a passenger car, which is guided in the door by a pair of rails which can be generally parallel to one another and are disposed along front and rear edges of the window frame but which lie wholly inwardly of the outer surface of the window and preferably are formed as channels receiving guide shoes or members of the respective pane. According to an essential feature of the invention, these members are affixed along the inner face of the pane, i.e. the surface of the pane turned toward the interior of the vehicle, inwardly of the respective edges so that along these edges there are formed zones free from any element which might impede the sealing engagement of window-sealing strips with these edges of the pane. In other words, the guided edges of the pane are not enclosed within the guide channels or rails and are left free from guide members or shoes so that continuous engagement with the seal between the seal and the inner face of the window is possible along these edges.

While the seal can engage only the inner face of the pane along these edges, it is frequently advantageous to have the seal engage the periphery of the pane as well.

In the system of the present invention, therefore, the guide members which engage the rails are located on the inner side of the pane so that in the closed condition of the window the entire pane above the body of the door can be exposed to form part of the outer surface of the vehicle. It is no longer necessary to enclose the outer edge of the pane in any sheath or like member, nor need the door frame engage the outer surface of the frame.

Since the pane is reliably guided from within, pressure gradients toward the exterior do not tend to bend the pane outwardly.

The seal with which the pane cooperates can extend continuously along the window which can be provided on the door such that the outer surface of the door body and the outer surface of the frame lie flush with one another.

The window structure of the present invention need not be used only in vehicle doors and can be used for movable windows in fixed portions of the vehicle body (e.g. rear side windows) or as the rear window of the vehicle. When the window assembly is used in a door, however, it has been found to be advantageous to provide the rails so that they extend upwardly (vertically) over the door body and advantageously form a window frame which accommodates the window in the closed position for greater stability.

Advantageously, the guide rail is formed in one piece (unitarily) with the window frame, thereby providing a compact construction of the latter. A portion of the frame can then form part of the outer surface of the door and can be provided with sealing strips which engage the pane.

When the assembly is used for the front door of the vehicle, it has been found to be advantageous to form only the rear shank or member of the frame, which extends to the top of the window frame, with a guide rail. The front rail can terminate wholly within the lower door body or can project only to a limited degree thereabove. In the forward region of the window frame, above the door body it is advantageous to provide a wedge-shaped guide element which brings the pane in its fully closed position, into effective engagement with the seal.

In a preferred embodiment of the invention, the projection of the guide rails upon the surface of the pane lies within the perimeter thereof. This allows the light-transmitting and viewing area to be as large as possible and facilitates large area glazing of the side of the vehicle so that the latter appears for the most part to be frame free at least from the exterior.

Especially in the last mentioned embodiment, the inner side of the pane can be provided close to its upper edge with a member adapted to engage, in the closed position of the window, the upper shank of the window frame to maintain the seal even at high speeds of the vehicle.

BRIEF DESCRIPTION OF THE DRAWING

The above and other objects, features and advantages of the present invention will become more readily apparent from the following description, reference being made to the accompanying drawing in which:

FIG. 1 is a side-elevational view, partly in diagrammatic form, of a portion of the front door of an automotive passenger vehicle provided with a window assembly according to the invention;

FIG. 2a is a cross-sectional view taken along the line II—II of FIG. 1;

FIG. 2b is a view corresponding to FIG. 2a and hence representing a similar sectional view but illustrating another embodiment of the invention;

FIG. 3 is a cross-sectional view taken along the line III—III of FIG. 1;

FIG. 4 is a diagrammatic elevational view of the side doors of a four-door automotive vehicle according to the invention with the windshield and roof structures illustrated somewhat schematically and bent out of their normal positions;

FIG. 5 is a diagrammatic cross-sectional view taken along the line V—V through only a portion of the fixed front window and the movable main window of the front door;

FIG. 6 is a cross section through the door posed between the front and rear doors of the vehicle of FIG. 4, generally along the line VI—VI;

FIG. 7 is a cross-sectional view taken along the line VII—VII of FIG. 4; and

FIG. 8 is a cross-sectional view similar to FIG. 3 but illustrating another embodiment of the invention.

SPECIFIC DESCRIPTION

FIG. 1 is a diagrammatic representation of the left front door of an automobile provided with a door body 9 and window frame 11.

A scissor linkage 13' shown in broken lines in the door body and only diagrammatically, is provided to raise and lower the window 13 in the window frame 11. The linkage 13' may be any conventional window-actuating mechanism and can, for example, include a handle 13a' along the inner wall of the door which drives a pinion 13b' which rotates a sector 13c' attached to one arm 13d' having a pin 13e' guided in a slot 13f'. The other window assemblies described are likewise provided with such a raising mechanism.

The arm 13d' is hinged at 13g' to a metal bar 13h' formed along the lower edge of the window pane 13 and to which is pivotally joined at 13i' another bar 13j' whose pin 13k' is guided in a slot 13m'. The links 13j' and 13d' are pivotally connected at 13n' and the bar 13h' may be slotted to receive the pins 13g' and 13i'.

Thus when the handle 13a' is cranked, the window can be raised into the position shown in solid lines (closed position) or lowered into the dot-dash line position.

The window frame 11 is formed with an upper shank 15, a rear upright shank 19 which can be parallel to the shank 17. In the small triangular region represented at 21, left between the upper frame member 15 and the frame member 17, a rearview mirror can be mounted.

The frame members 15, 17, 19 all are constituted, in the usual way, of sheet metal profiles, i.e. sheet metal members which are bent into a channel or tubular configuration (see FIGS. 2a, 2b, 3 and 8). Naturally they can be deep drawn members of the inner sheet-metal or outer sheet-metal walls of the door, can be separate pieces attached to the door, or can be extruded synthetic resin or metal profile members.

FIG. 2a represents a first embodiment of the rear guide shank 19 along which the window 13 is shifted.

In this case, the shank or rail 19 is formed with a guide channel 23 having a slit 25 turned toward the window 13. The shank 19 is also provided with a rib 26 whose outer surface 27 is turned freely toward the exterior and which defines various recesses as will be described in greater detail below.

For example, the rib 26 defines a recess 29 in which a sealing strip can be forced to seal the window frame against the body of the vehicle.

The window 13 is formed proximal to but inwardly of its rear edge 31 with a guide member or shoe 33 which can be composed of metal or synthetic resin and is generally also an extruded profile. This shoe 33 is attached by adhesive to the glass pane or is connected thereto by screws passing through holes previously provided in the glass pane.

The shoe 33 has a foot 35a resting upon the inner face 13a of the window 13 and secured thereto in the manner previously described. A web 35 extends perpendicular to the window 13 into the slit 25 and carries a pair of laterally extending ribs 37 and 37a. The rib 37a has a projection 37b which rides along an inwardly turned flange 25a of member 19 defining the slit 25. Another surface 37c of rib 37 rides along the inner flank 23a of the channel 23. The other rib 37a has a rearwardly turned extension 37d which rides along the flange 25b of the channel 23 defining the other side of the slit 25. Thus the ribs 37 etc. guide the window withn the channel 23.

Between the rib 26 and slit 25, an elastic seal 39 is disposed to seal the edge of the window 31 relative to the frame member 19. This seal can be placed into a recess 26a defined between the rib 26 and the flange 25b.

As is evident immediately from FIG. 2a, the outer surface of the window 13 is connected with the outer surface 27 of frame member 19 and the edge of the window 31 and the inner surface of the window by the seal 39 so that the outer face of the vehicle is practically flush, i.e. surface 13b of the window, surface 39a of the seal and the surface 27 run together without any sharp discontinuities. Naturally the seal 39, the web 35 and the ribs 37 are dimensioned so that a smooth guiding of the window 13 is achieved.

In the following description, structural elements equivalent to those described originally will be designated by corresponding reference numerals with different hundred-series numerals preceding them.

In the embodiment of FIG. 2b, the rear frame member 119 has a wider slit 125 defined between a flange 123a extending perpendicular to the window 13 whose guide member 133 is correspondingly the rib 137 which bears only against the flange 123a while its other rib 137a has the formation 137b bearing against the flange 125b as previously described. In this embodiment as well, the outer surface 127 of the rib 126 is formed by or covered by a decorative foil 41 which can cover the exposed portions of the frame and is, for example, chromium plated.

Since the channel 123 is opened toward the window with a wider slit 125, in this embodiment, the guide member 133 can be thrust laterally through the opening into the shank 119 of the frame. In the embodiment of FIG. 2a, the insertion of the shoe 33 into the frame member must be effected longitudinally, i.e. from the lower end of the frame.

FIG. 3 shows a section through the upper shank 15 of the frame. This shank 15 is basically similar to the shanks 19, 119 previously described in that a hollow 223 is provided in the profile member and the slot (25, 125) is omitted. Thus the rib 226 may be covered by the foil strip 241 and may define the recess 229 receiving a sealing strip and a recess 226a receiving the seal 239 which engages the edge of the window 13. In the embodiment illustrated in FIG. 3, the window is shown to abut the seal 239 and hence this view corresponds to a fully closed position of the window.

The front shank or guide member for the window 13, represented only diagrammatically at 17 in FIG. 1, can be constructed similarly to the rear frame member 19, 119 and can receive a corresponding guide member or shoe 33, 133 on the window pane. In both cases, of course, the guide rail or member is disposed inwardly from the respective edge of the pane.

FIGS. 4 through 7 illustrate an embodiment of the window guide system of the present invention for a vehicle whose doors are not provided with separate window frames which lie laterally of the door and overlap a significant portion of the periphery of the window pane when the latter is in its closed position. As a result, in the closed position of the window, the light and visual obstruction is minimized.

In FIG. 4, for example, the front side door is shown at 45 adjacent the rear side door 47 of the vehicle. The side windows of the automobile comprise a fixed front triangular window 49, a front window 51 which can be lowered in the front door and a rear window 53 which can be lowered in the rear door. The triangular window 49 may also be pivotal to form a vent window.

The windows 51 and 53 can be provided with a front window frame 55 and a rear window frame 57, respectively.

As has been illustrated in FIG. 5, the front window frame 55 becomes, in the region of the forward edge of the triangular window 49, a tube 59 which is fixed to the door body. The tube 59 is enclosed in a sheath 61 provided with a planar outer surface 63 to which the triangular window 49 is bonded. The lower edge of the triangular window 49 is also received in a vertical flange of the door body which has not been shown in any detail in the drawing. In the region of the rear edge of the triangular window 49, the vertical member of the frame 55 extends downwardly as a tube 63 which is enclosed in a sheath 65. The rear edge of the triangular window 49 is cemented to a planar outer surface 67 of this sheath and the rearwardly turned portion of the sheath is provided with an upright recess or channel 69 forming a guide rail for a roller 71 which is formed on an end of a forward projection 73' of a holder (guide member) 73 bonded to the window 51 inwardly of its forward edge.

The forward edge of the pane 51 thus can be engaged by a seal 72 which can be press fitted into a recess 65' of the sheath 65. The seal 72 is shown in its undeformed state in FIG. 5.

FIG. 6 shows the construction of the window guide assembly in the region of the central column or doorpost of the automobile. This central column or doorpost is represented generally at 75 in FIG. 6 and can be made by welding together from deep drawn elongated pieces of sheet metal.

The front window frame 55, in the region of the doorpost, extends into a vertical shank or frame member 77 in which a slit 81 opens toward the window 51 inwardly of its edge.

A shoe 85, forming a guide member, has a T-shaped base which is bonded to the inner surface of the glass pane 51. A web 85b of this shoe extends through the slot and a T-shaped head beyond the entrance to the slot is shown at 85c and is formed with a pair of members slidably engaging the inner faces of the flanges defining the slot within the channel 77'.

Similarly, and mirror symmetrically, the forward vertical member 79 of frame 57 has an outwardly open slot 83 defined by flanges 83c which flank the shoe 87 and are slidably engaged by the oppositely extending portions 85b of the shoe 87 bonded to the pane 53 inwardly of this edge.

Member 79 thus is also formed with a channel 79' in which and along which the shoe 87 guides the pane 53.

The rear edge of the pane 53 is provided with a guide member 77 similar to the one guiding the rear edge of pane 51 (56) so that both edges of both movable panes are guided in the manner described in the region's edges of the respective pane but inwardly thereof.

The outwardly extending flange 89 of the doorpost or column 75 is provided with a seal 91 against which the pane can rest. As can be seen from FIG. 6 (and from FIG. 5 as well) at their adjacent edges, all of the windows along each side of the vehicle are flush with one another. An outwardly extending flange 93 from the post 75 projects in the opposite direction, i.e. inwardly into the vehicle and can be covered by a sheathing member 95 to improve the esthetics of the system. The seal 91, as also the seal 72 in FIG. 5, is shown in its undeformed state.

The cover member 95 thus receives the frame members 77 and 79 in the closed state of the doors 45 and 47.

FIG. 7 shows the upper portion of the assembly which comprises a horizontal tube 97 forming a horizontal shank of the window frame 55 and which is covered in the interior of the vehicle with a sheath member 99 so as to provide an esthetic enclosure for this portion of the frame.

The cover member 99 is formed with a recess 101 into which a detent 103 can reach, the detent 103 being fixed to the pane 51 (or 53) but fastened to the latter somewhat inwardly of the upper edge. When the window is fully closed, therefore, and the upper edge abuts a seal 107 mounted on the roof structure 105 of the vehicle, the indexing or positioning member 103 engages behind the tube 97 and is held by this tube so that even with high pressure within the vehicle the window is not urged away from the seal 107.

Thus the embodiment of FIGS. 4 through 7, when the windows are closed, provides a gap-free substantially flush structure whereby the panes are flush with each other and with the structural members of the vehicle body minimizing air resistance, limit the production of noise even at high speed and prevent chattering or vibration of the panes. The up and down movement may be effected by mechanisms of the type described and, in addition, a perfect seal can be maintained all around the portions of the pane above the body of the door in the closed position of each window.

In this embodiment, moreover, when each window is fully closed, its edges projecting from the body of the door lie directly against sealing strips 91, 72 and 107 which are received in members of the vehicle body directly so that the need for separate seals between window and frame and between frame and body is eliminated.

Finally, in this connection, the sealing of the interior of the vehicle is improved since gaps are eliminated as previously described.

The window frames can be of small cross section and hence a saving of weight can be achieved while the reduced projection of the frame on the plane of the respective window panes can be minimized so that the sight of the driver and passengers is improved through the side windows of the vehicle.

In FIG. 8 we have shown a window pane 313 which is guided somewhat differently from the pane 213 in the embodiment of FIG. 3. Here the rib 226 of the frame member 315 is replaced by a rib 326 which only defines the channel 329 to receive a sealing strip disposed between the frame and the vehicle body. This rib 326 does not reach around the edge of the pane 313 as is the case with the embodiment of FIG. 3 and the seal 339 at the top of the frame is thus bonded to the flange 315' of the frame member 315 juxtaposed with the inner surface 313a of the pane.

The portions of the sealing strips 39, 139, 239 and 339 engaging the window panes may be serrated, grooved or channeled to form labyrinth seals in each case.

It will be apparent that a similar construction may be used for the frame members 19 and 119 so that here too the ribs 26 and 126 need not reach around the edge of the pane.

We claim:

1. A window assembly for an automotive vehicle having a body, said assembly comprising:
    a window pane adapted to be raised from and lowered into said body and having at least one substantially vertical edge;
    a respective substantially vertical guide rail mounted on said body and disposed along said edge;
    at least one guide member directly fixed to said pane along a face thereof turned toward the interior of the vehicle and disposed inwardly of a respective one of said edges for engagement with and guidance by said rail whereby a continuous zone on said face and along said edge outwardly of said guide member is formed without obstruction;
    sealing means on said body simultaneously engaging directly said zone of said face and said edge outwardly of said guide member at least in a closed position of the window assembly; and
    mechanism on said body for raising and lowering said pane with said guide member guided by said rail.

2. The assembly defined in claim 1 wherein said rail is formed unitarily with a window frame disposed above said body and provided with said sealing means.

3. The assembly defined in claim 1 wherein said rail has a projection on said face lying inwardly of said edge.

4. The assembly defined in claim 2 wherein said frame is formed with a substantially horizontal shank, said pane being provided on said face below the upper edge of said pane with a member engaging said shank in a raised position of said pane.

5. The assembly defined in claim 1 wherein a further rail is provided along an opposite edge of said pane and said pane is provided with a further guide member receivable in said further rail.

6. The assembly defined in claim 5 wherein said rails are formed as channels open toward said face.

7. The assembly defined in claim 6 wherein said rails form part of a frame on said body having an outer surface flush with the outer surface of said body, said frame being formed with a recess receiving a sealing strip engaging said face.

8. The assembly defined in claim 1 wherein said body is the body of a vehicle door.

* * * * *